Patented June 6, 1950

2,510,853

UNITED STATES PATENT OFFICE 2,510,853

METHYL OCTADECYL DICHLOROSILANE

Arthur J. Barry and Donald E. Hook, Midland, and Lee De Pree, Holland, Mich., assignors to The Dow Chemical Company, Midland, Mich., a corporation of Delaware No Drawing. Application June 6, 1946, Serial No. 674,926

1 Claim. (Cl. 260—448.2)

This invention relates to a method of making organosilicon compounds and to certain new compounds made by the method. It is particularly concerned with the preparation of organohalosilanes having more than one hydrocarbon radical attached to the silicon atom in the molecule.

We have found that an organohalosilane which contains at least one hydrogen and one halogen attached to the silicon atom, e. g. a monoalkyl dihalosilane, may be caused to react with an organic compound containing one or more double bonds between carbon atoms in the molecule, to produce a poly-organohalosilane. The reaction is one of addition and by-products usually are not formed to an appreciable extent. However, when employing an aromatic compound such as benzene or chlorobenzene as a reactant, the addition compound is apparently unstable and usually undergoes partial decomposition, e. g. loss of hydrogen or hydrogen chloride, respectively, with the result that a corresponding aryl silicon compound is formed.

The reactions involved may be illustrated by the equations:

(1) 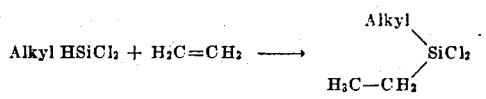

(2) 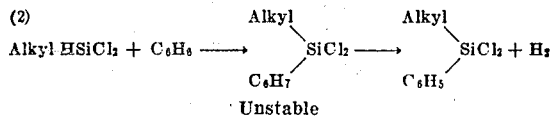
   Unstable (3) 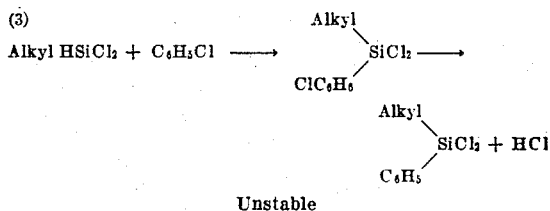
   Unstable (3a) 

The reaction may be carried out over a wide range of temperature, e. g. from 200° C. or below to 600° C. or higher. The preferred temperature varies, of course, with changes in the hydrocarbon reactant, and the conditions under which the reaction is conducted, but usually lies within the range of from 200° to 550° C. In general, temperatures of from 200° to 300° C. are most satisfactory when using an olefine as a reactant, and temperatures of from 300° to 550° C. are more suitable when an aromatic hydrocarbon is employed. The rate and efficiency of the reaction are dependent to a large extent upon the proximity of the molecules to be reacted. For this reason the reaction is ordinarily carried out in a closed system at a pressure above 100 pounds per square inch, and usually in the order of from 200 to 2500 pounds per square inch or higher. Employment of a pressure sufficient to liquefy a portion of the reaction mixture results in rapid reaction at a lower temperature than when the mixture is entirely in the vapor phase. The pressure may be developed autogenously within a system or may be superimposed by means of a pump or by development of a hydrostatic pressure.

Organohalosilanes which may be employed as reactants are compounds of silicon containing both halogen and hydrogen atoms attached directly to the silicon atom, the remaining valences of the silicon being satisfied by hydrocarbon radicals. Suitable organohalosilane starting materials include phenyl dibromosilane, $C_6H_5SiHBr_2$, ethyl methyl chlorosilane, $CH_3(C_2H_5)SiHCl$, propyl dichlorosilane, $C_3H_7SiHCl_2$, methyl dichlorosilane, $CH_3SiHCl_2$, octadecyl dichlorosilane, $C_{18}H_{37}SiHCl_2$, ethyl dibromosilane, $C_2H_5SiHBr_2$, p-methylphenyl dichlorosilane, $C_7H_7SiHCl_2$, etc.

Unsaturated organic compounds suitable for this invention comprise hydrocarbons containing one or more double bonds in the molecule. They may be aliphatic, alicyclic, aromatic or mixed aliphatic-aromatic hydrocarbons. Examples of satisfactory hydrocarbon starting materials include ethylene, propylene, butene, pentene, hexene, octene, decene, tetradecene, octadecene, cyclohexene, styrene, butadiene, hexadiene, unvulcanized rubber, benzene, toluene, etc. Substituted hydrocarbons, such as halogenated hydrocarbons, may also be used, e. g. as a source-material for formation in situ of an olefinic reactant. Thus, for example, we may employ ethyl bromide, butyl chloride, octadecyl chloride, chlorobenzene, etc., as starting materials. It might be pointed out that, when a halogenated hydrocarbon is one of the reactants in our process, the corresponding hydrogen halide is formed. As illustrated in Equation 3a given above, it in turn reacts with the organohalosilane starting material to produce a more highly halogenated organosilane and hydrogen.

Commercial grades of the starting materials may be employed, but impurities present in reactants of technical quality sometimes take part in side reactions which consume a portion of the organohalosilane with resultant reduction in the yield of the desired product. Because of the fact that the reaction products are hydrolyzable, it is important that the reaction be carried out under substantially anhydrous conditions. The absence of oxygen is also desirable.

The preferred mode of practicing the invention involves heating a mixture of the hydrocarbon reactant and an organohalosilane in a suitable reaction vessel, e. g. a bomb or autoclave. Usually from 0.5 to 3.0 molar equivalents of organohalosilane are employed for each molar equivalent of hydrocarbon material, although much greater or smaller proportions may be used. It is sometimes advantageous to employ a solvent, e. g. a saturated fraction of petroleum, which is substantially inert under the reaction conditions to insure mutual solution of the starting materials. Once initiated, the reaction proceeds rapidly until one of the components is substantially exhausted, as indicated by a reduction in pressure. Thereafter, the reaction products and any unreacted materials are withdrawn from the reactor and purified, e. g. by fractional distillation. Unreacted components may be returned to stock for further processing. The process may also be carried out in continuous manner, e. g. by passing a stream of the reaction mixture under pressure through a heated tubular autoclave.

The process, as just described, has been applied in preparing a variety of previously known diorganohalosilanes more conveniently than has heretofore been possible. It has also been applied in making new diorganohalosilanes having the general formula:

wherein R represents a lower alkyl radical containing less than 5 carbon atoms, R' represents a higher alkyl radical containing at least 8 carbon atoms, and X represents a halogen, e. g. chlorine or bromine. When applied to hydrophilic solids, the new compounds modify surfaces of the solids to render them more permanently repellent to water than when treated in like manner with the di-(lower alkyl) dihalosilanes previously known.

The following examples illustrate certain ways in which the principle of the invention has been applied, but are not to be construed as limiting the invention:

*Example 1*

Approximately 115 grams of methyl dichlorosilane, $CH_3SiHCl_2$, and 29 grams of ethylene were charged into a bomb of 500 milliliters capacity. The bomb was heated externally, while being rotated, and in a period of about one hour was brought to a temperature of approximately 300° C. as measured by a thermocouple in a thermocouple well. The pressure maximum attained within the system was 1600 pounds per square inch. At the end of 16.5 hours, the bomb was cooled and vented through condensers. The condensate was subsequently fractionally distilled. As a fraction distilling at approximately 100° C., at 744 millimeters absolute pressure, there was obtained methyl ethyl dichlorosilane. The product was a colorless liquid having a specific gravity,

of 1.067. Unreacted methyl dichlorosilane was also recovered.

*Example 2*

Approximately 200 grams of a mixture of 80 parts by weight of phenyl dichlorosilane, $C_6H_5SiHCl_2$, in 20 parts of diethylbenzene, and 32 grams of ethylene was reacted in a bomb and the product collected and purified as in Example 1. As a fraction distilling at from 134° to 135.5° C. at 50 millimeters absolute pressure, there was obtained phenyl ethyl dichlorosilane, $$C_6H_5(C_2H_5)SiCl_2$$

*Example 3*

A mixture comprising 0.45 gram molecular weight of phenyl dichlorosilane in diethylbenzene and 0.55 gram mol of propylene was reacted by heating in a bomb at approximately 300° C. for 18 hours. The product was collected and purified as in the preceding examples. As a fraction distilling at from 140° to 144° C. at from 44 to 47 millimeters absolute pressure, there was obtained phenyl propyl dichlorosilane, $C_6H_5(C_3H_7)SiCl_2$. The latter is a colorless liquid having a specific gravity, $d^{20}_{20}$ of 1.08.

*Example 4*

An equimolecular mixture of propylene and methyl dichlorosilane was heated in a bomb for 16 hours at approximately 300° C. Thereafter, the products were collected and purified as in the preceding examples. As a fraction distilling at from 123° to 124° C. at 747 millimeters absolute pressure, there was obtained methyl propyl dichlorosilane, $CH_3(C_3H_7)SiCl_2$, in 72 per cent of theoretical yield. Unreacted methyl dichlorosilane was also recovered.

*Example 5*

A mixture of 3 gram mols of benzene and 3 gram mols of methyl dichlorosilane, $CH_3SiHCl_2$, was reacted by heating in a bomb at 470° to 530° C. for 8 hours. The bomb was then cooled and the products collected and fractionally distilled. As a fraction distilling at from 102° to 103° C. at 30 millimeters absolute pressure, there was obtained phenyl methyl dichlorosilane, $$C_6H_5(CH_3)SiCl_2$$

Unreacted benzene and methyl dichlorosilane were also recovered.

*Example 6*

A mixture consisting of 1 gram mol of methyl phenyl chlorosilane, $CH_3(C_6H_5)SiHCl$, and 1 gram mol of propylene was reacted by heating in a bomb of 500 milliliters capacity, at a temperature of from 293° to 314° C. After completing the reaction, the products were separated as in the preceding examples. As a fraction distilling at from 124° to 126° C. at 30 millimeters absolute pressure, there was obtained methyl phenyl propyl chlorosilane, $CH_3(C_3H_7)C_6H_5SiCl$. It is a colorless liquid having a specific gravity,

of 1.004.

*Example 7*

A mixture comprising 2 gram mols of chlorobenzene and 4 gram mols of methyl dichlorosilane, $CH_3SiHCl_2$, was heated in a 2.4 liter bomb for approximately 16 hours, at a temperature of from 445° to 460° C. The reaction products were cooled, collected and subsequently fractionally distilled. As a fraction distilling at approximately 114° to 115° C. at 50 millimeters absolute pressure, there was obtained phenyl methyl dichlorosilane.

Methyl trichlorosilane, benzene, and unreacted methyl dichlorosilane were also obtained.

*Example 8*

By procedure similar to that described in preceding examples, 3 gram mols of octene and 3 gram mols of methyl dichlorosilane were reacted and the products collected and subsequently fractionally distilled.

As the major reaction product, there was obtained methyl n-octyl dichlorosilane, $$CH_3(C_8H_{17})SiCl_2$$

distilling at from 115° to 117° C. at 20 millimeters, and having a specific gravity,

of 0.984. Another fraction, distilling at 109° to 110° C. at 20 millimeters and having a specific gravity,

of 0.992 apparently is methyl 2-octyl dichlorosilane, $CH_3(C_8H_{17})SiCl_2$. Analysis of the two fractions gave the following results:

| Fraction | Percent Silicon | Percent Chlorine |
|---|---|---|
| 115°–117° C./20 mm | 12.0 | 31.3 |
| 109°–110° C./20 mm | 11.8 | 31.0 |
| Theory for $CH_3(C_8H_{17})SiCl_2$ | 12.3 | 31.3 |

A minor amount of methyltrichlorosilane was also produced.

*Example 9*

By procedure similar to that described in preceding examples, octadecene was reacted with methyl dichlorosilane, and the products collected and purified as before. Methyl octadecyl dichlorosilane, $CH_3(C_{18}H_{37})SiCl_2$, B. P. 185° C. at 2.5 millimeters pressure, was obtained. It is a colorless liquid having a specific gravity,

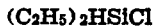

of 0.930.

*Example 10*

By procedure similar to that described in preceding examples diethyl chlorosilane, $$(C_2H_5)_2HSiCl$$

and propylene were reacted to produce diethyl propyl chlorosilane, $(C_2H_5)_2C_3H_7SiCl$, distilling at from 164° to 165° C., at 742 millimeters pressure. So far as is known, this is the first time this compound has been isolated and characterized.

Operating in a manner similar to that described in the examples given above, methyl dichlorosilane and p-chlorotoluene may be reacted to produce methyl tolyl dichlorosilane; propylene may be reacted with methyl dibromosilane to form methyl propyl dibromosilane; ethyl dichlorosilane and propylene may be reacted to yield ethyl propyl dichlorosilane; diphenylchlorosilane and propylene may be reacted to produce diphenyl propyl chlorosilane, methyl dibromosilane and dodecene may be reacted to give methyl dodecyl dibromosilane; ethyl dichlorosilane may be reacted with octadecene to produce ethyl octadecyl dichlorosilane, etc.

Other modes of applying the invention may be employed instead of those explained, change being made as regards the compounds and materials herein disclosed, provided the steps or compounds stated by the following claim or equivalents of such steps or compounds be employed.

We therefore point out and distinctly claim:

Liquid methyl octadecyl dichlorosilane, distilling at approximately 185° C. at 2.5 millimeters absolute pressure.

ARTHUR J. BARRY.
DONALD E. HOOK.
LEE DE PREE.

REFERENCES CITED

The following references are of record in the file of this patent:

UNITED STATES PATENTS

| Number | Name | Date |
|---|---|---|
| 2,030,739 | Bley | Feb. 11, 1936 |
| 2,129,281 | Lincoln et al. | Sept. 6, 1938 |
| 2,253,128 | Longkammer | Aug. 19, 1941 |
| 2,306,222 | Patnode | Dec. 22, 1942 |
| 2,375,007 | Larson et al. | May 5, 1945 |
| 2,379,821 | Miller et al. | July 3, 1945 |
| 2,405,019 | Dalin | July 30, 1946 |
| 2,405,988 | Barry | Aug. 20, 1946 |
| 2,407,181 | Scott | Sept. 3, 1946 |
| 2,426,122 | Rust | Aug. 19, 1947 |

OTHER REFERENCES

Rochow, Chem. Engineering News, vol. 23 (7), pages 612–616 (April 1945).